(12) United States Patent
Hertwig et al.

(10) Patent No.: US 6,708,253 B2
(45) Date of Patent: Mar. 16, 2004

(54) PROCESSOR MEMORY SYSTEM

(75) Inventors: Axel Hertwig, Nürnberg (DE); Harald Bauer, Nürnberg (DE); Urs Fawer, Baden (CH)

(73) Assignee: Koninklijke Philips Electronics N.V, Eindhoven (NL)

( * ) Notice: Subject to any disclaimer, the term of this patent is extended or adjusted under 35 U.S.C. 154(b) by 100 days.

(21) Appl. No.: 09/929,131

(22) Filed: Aug. 14, 2001

(65) Prior Publication Data

US 2002/0049888 A1 Apr. 25, 2002

(30) Foreign Application Priority Data

Aug. 17, 2000 (DE) .......................... 100 40 267

(51) Int. Cl.[7] ............................... C06F 12/00
(52) U.S. Cl. .................. 711/117; 711/103; 711/135; 711/143
(58) Field of Search .................. 711/103, 117, 711/135, 143

(56) References Cited

U.S. PATENT DOCUMENTS

| | | | | |
|---|---|---|---|---|
| 5,056,002 A | * | 10/1991 | Watanabe | 711/119 |
| 5,877,975 A | * | 3/1999 | Jigour et al. | 365/52 |
| 6,226,338 B1 | * | 5/2001 | Earnest | 375/372 |
| 6,301,635 B2 | * | 10/2001 | Bothwell et al. | 711/103 |

\* cited by examiner

*Primary Examiner*—Donald Sparks
*Assistant Examiner*—Mehdi Namazi
(74) *Attorney, Agent, or Firm*—Steven B. Biren

(57) ABSTRACT

A processor memory system which includes:
- a processor component provided with a processor and at least a first integrated RAM memory,
- at least one second, external memory which is coupled to the processor component via an interface,
- a programmable memory management component which is integrated in the processor component and checks, in the case of a data address requested by the processor, whether this data address is stored in the first RAM memory which serves as a fast memory and in which data from the external memory has been loaded in advance,
- wherein the memory management component indicates the RAM memory address at which the data associated with the memory address is stored if the data is present in the RAM memory, the data then being read from the RAM memory, and
- wherein, if the data address is not present in the RAM memory, the memory management component outputs an interrupt instruction to the processor which subsequently initiates the loading of the searched data address from the external memory into the RAM memory.

13 Claims, 3 Drawing Sheets

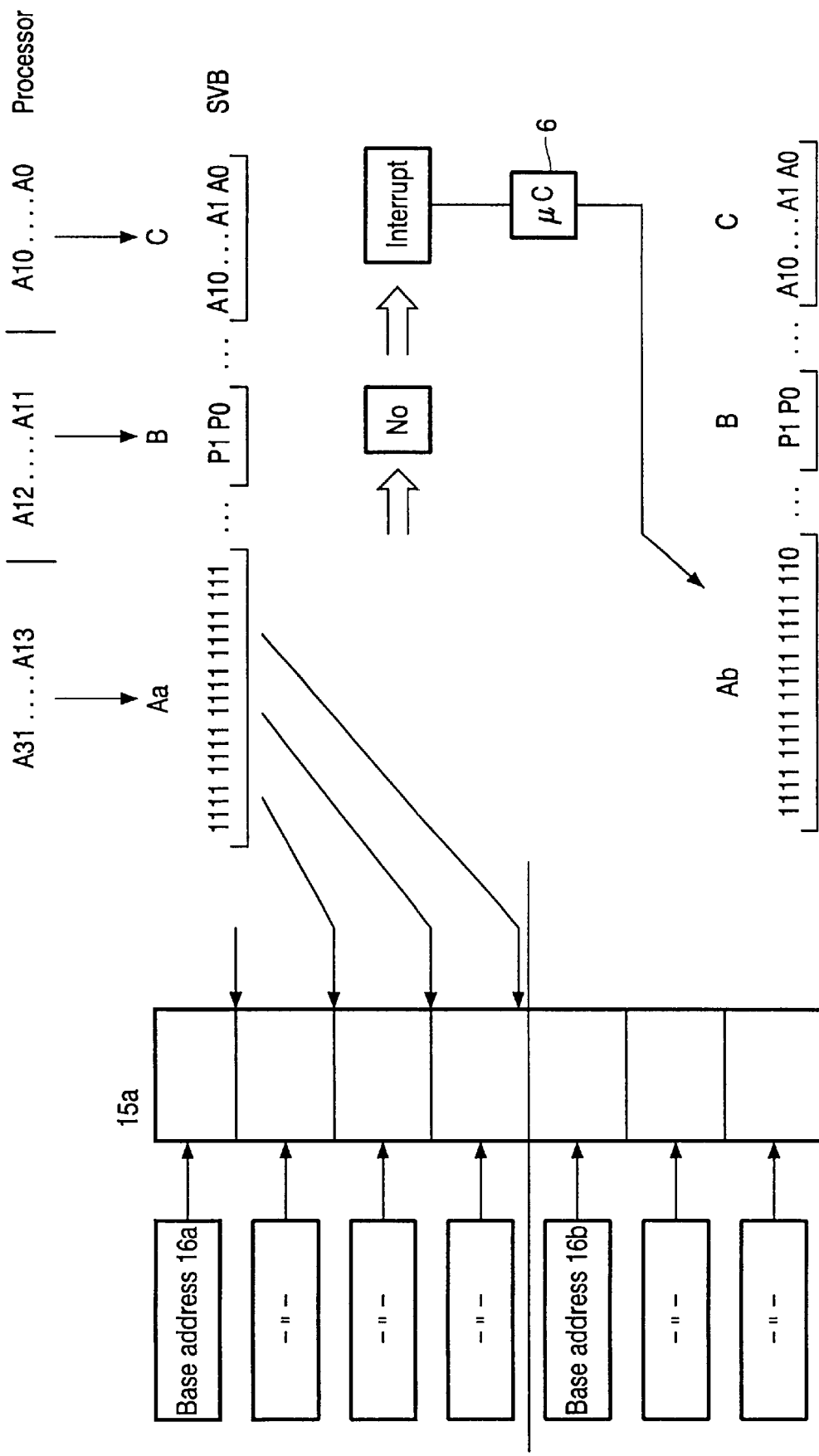

PROCESSOR MEMORY SYSTEM

Figure 1:
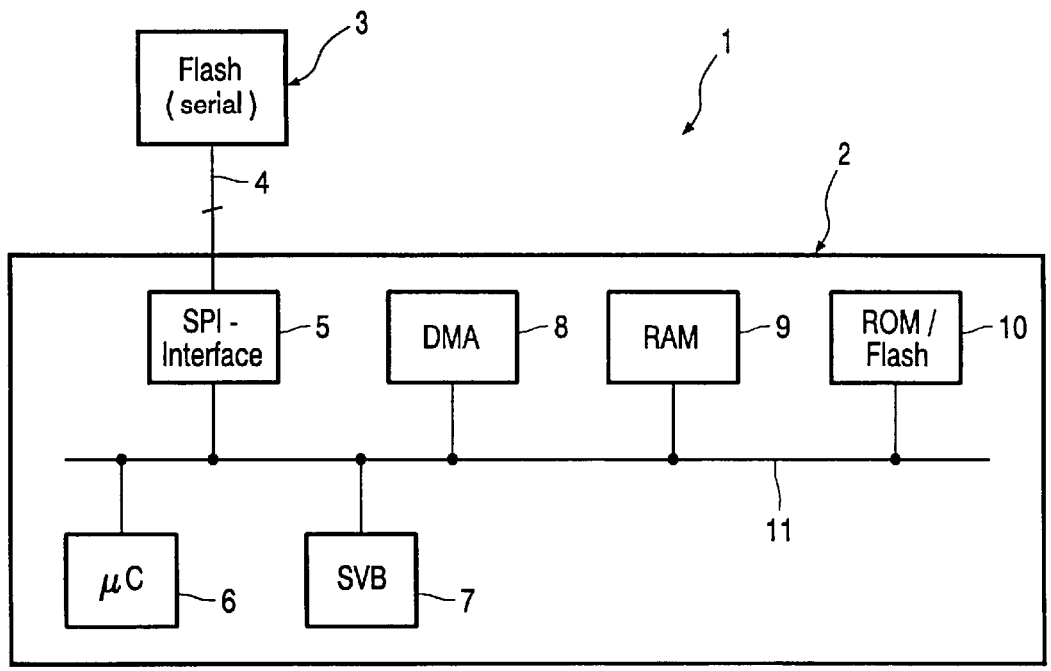

The invention relates to a processor memory system.

Processor memory systems of this kind are used whenever data is to be stored, processed and transferred. Typical fields of application can be found, for example in mobile radio telephony, in personal digital assistants and in minicomputers. The processor in such systems performs the actual data processing operations. The data required by the processor, usually being constant data such as programs or table data, is stored in the memory or memories. The processor reads such data from the memory when needed.

Various concepts are known in the context of such processor/memory communication or the data or memory management itself. Use is made of cache memories on the one hand and of virtual memories on the other hand. A cache memory is a fast memory in which data that is required frequently and at a high speed is loaded from a main memory. When the processor requests data, it is first checked whether this data is already present in the cache memory. If so, it is read; otherwise the missing data is loaded into the cache memory from the main memory. Such a case is referred to as a cache-miss. In the case of a cache-miss, the processor is held up by the insertion of wait states for the period of time during which the missing data is loaded from the main memory, meaning that the processor does not operate during this time. Such holding up of the processor is longer or shorter in dependence on the magnitude of the missing data set to be loaded.

A virtual memory serves to enable optimum use of a main memory. Such a main memory is, for example a CD-ROM or a hard disk memory. In the case of such a type of memory the processor generates a virtual address which is converted by the virtual memory management so as to obtain the physical address at which the data searched is stored in the main memory, for example, on the hard disk. The virtual address space is then significantly larger than the physical address space; no relationship exists therebetween. When a page fault occurs, however, the processor is not held up in the case of a virtual memory; merely an interrupt instruction which interrupts the program being executed by the processor at that instant is issued. However, the processor itself is still in a position to continue with other programs or operations during the attempted loading of the missing data from, for example, an auxiliary memory. However, such loading of the data is very time consuming and takes a period of time that is a number of times longer than in the case of the cache memory.

Both concepts are not very well suitable whenever integrated programs or data memories in a processor component have to be supplemented with an external memory. Such configurations are encountered, for example in embedded systems whose application imposes different requirements as regards the real-time behavior. Typical applications are mobile radio telephony and the like as described.

Therefore, the problem to be solved by the invention is to provide a processor memory system which enables connection of a memory to a highly integrated processor component while ensuring fast data transfer or fast data processing by the processor on the one hand without affecting the processor operation in the case of a data access failure on the other hand.

In order to solve this problem there is provided a processor memory system which includes:

a processor component provided with a processor and at least a first integrated RAM memory, at least one second, external memory which is coupled to the processor component via an interface, a programmable memory management component which is integrated in the processor component and checks, in the case of a data address requested by the processor, whether this data address is stored in the first RAM memory which serves as a fast memory and in which data from the external memory has been loaded in advance, wherein the memory management component indicates the RAM memory address at which the data associated with the data address is stored if the data is present in the RAM memory, the data then being read from the RAM memory, and wherein, if the data is not present in the RAM memory, the memory management component outputs an interrupt instruction to the processor which subsequently initiates the loading of the data searched from the external memory to the indicated data address in the RAM memory.

The programmable memory management component provided in accordance with the invention performs a central role in the proposed processor memory system. On the one hand it acts as a cache memory without a specially constructed memory section; a normal RAM memory is now used as an associated memory. The memory management component exhibits such a behavior when the data address is applied thereto by the processor and this component searches and finds this address in the associated memory map. This is because, if it is present, that is, if it is already present in the RAM memory, the memory management component "bends" the address pointer and enables the reading of the data from the relevant memory location in the RAM memory. The memory management component thus behaves in the same way as a customary cache memory.

In the case of a "cache-miss", that is, when the data address is not present in the RAM memory, the memory management component acts as a programmable virtual memory and no longer like a cache memory. In the case of detected absence of the searched data address a programmed interrupt instruction is applied to the processor, with the result that merely the current routine is held up. The processor itself remains ready to carry out other activities. Unlike in the case of a normal cache memory, there is no waiting period but only an interrupt which is initiated via the memory management component. The processor then autonomously executes the necessary activities for the loading of the searched data address. In the mean time the memory management component is passive, which means that it does not interfere with the further operation. It is only after the termination of the loading process, that is, when the processor resumes the execution of the routine stopped by the interrupt instruction, that the memory management component is "reset" again so that it again behaves in the sense of a cache memory, that is, in as far as the data address subsequently searched is present.

The processor memory system in accordance with the invention in principle enables the execution of programs from an added external memory; the term "programs" as used in this context is to be understood to include all read data, for example, programs themselves but also table data etc. As a result of the flexibility thus created, the activity of the memory management component, that is the memory management itself, can remain concealed from the application programmer or can also be influenced, if necessary, by the application itself. The system in accordance with the invention offers all advantages of a fast cache memory in combination with the advantages of a virtual memory, that is the execution of other tasks by means of the processor during the loading of data.

Preferably, there is provided a data address register in which the data addresses of the data stored in pages in the RAM memory are stored so as to enable the memory management component to perform a simple check on the requested data address. The data address register is preferably constructed as a 4-page address register. Considering the possibility for the processor to be active in a different sense during the loading in a system in accordance with the invention, it is not necessary to provide a high-volume address register. It suffices when the data register contains only a few page addresses, that is, only a comparatively small number of pages, for example, four pages, are stored in advance in the RAM memory in the sense of a cache memory. Due to the limitation to a few pages, it is advantageously possible to dispense with a conversion table with an entry for each feasible memory page as is necessary in known virtual memories. In order to check the requested data address, it is merely necessary to compare the limited amount of address information of the memory pages present with the requested address, so that overall the comparison can be performed very quickly. The method itself is fully associative.

It is also advantageous to provide a second data address register, in which case first the addresses in the first data register are checked in the context of the address check; in case the searched address is absent, the register address which indicates in which register the check takes place is changed by the processor so that the check can be performed in the second data address register. This makes it advantageously possible to perform on the one hand the search primarily in the first address register, because it is to be assumed that the searched data addresses usually are also found therein. It is only in the case of a miss that quasi a change-over takes place, the memory management component then searching in the second address register which may also be constructed as a 4-page register. This means that a register expansion is thus achieved, without the expanded register having to be completely searched during each search routine. Subsequent to the interrupt instruction, that is, when the address has not been found in the first register, the processor checks whether the address is present in the second register; this means that in this case the processor itself takes over the checking of the address. If this is the case, the memory management component is reprogrammed and subsequently searches the second address register and indicates the address searched and found therein. The foregoing thus constitutes a programmable conversion. This embodiment is not restricted to a second data address register but can be duplicated as many times as desired.

It may also be advantageous for the second or further data address registers not to be provided as registers in the memory management component, but in a RAM memory. In that case the processor programs data address registers present in the memory management component anew instead of switching over to another data address register.

Even though the interrupt routine required for the execution of the interrupt may be stored in the RAM memory that is present anyway, it is advantageous when at least one further memory is integrated in the processor component; in this further memory there is stored an interrupt routine whereto the processor reverts subsequent to the interrupt instruction from the memory management component. The interrupt routine may be conceived in such a manner that it initiates the previously described reprogramming of the data address registers. This further memory may be a ROM memory or a flash memory.

The amount of data that is (preferably page-wise) loaded from the external memory, or the size of the memory sections in the RAM memory, can preferably be changed or adjusted by the programmable memory management component in accordance with the invention. This represents a further advantage of the programmability of the memory management component which behaves quasi as a software-controlled cache, since it enables memory management with a flexible page size; this is simply possible by appropriate programming of the memory management component. This is also possible inter alia because the system in accordance with the invention utilizes, instead of a customary permanently assigned cache memory, a large RAM memory which can be dynamically used for the storage of the necessary data. This is because the subdivision in the RAM memory between data memories, in which data other than the data loaded from the external memory is stored, and the page memory, in which the external memory data is written, is determined only by the application and can be dynamically changed or configured by appropriate programming of the memory management.

It is a further advantage of the flexible memory management in conformity with the invention that arbitrary loading algorithms can be realized by means of the programmable memory management component. This is because the loading, being initiated via the interrupt instruction, can also be flexibly configured by appropriate programming of the memory management component and the loading routine. For example, not only the missing page can be loaded, but also the subsequent pages or the like. Arbitrary loading algorithms are feasible in this respect.

In order to load the data from the external memory, a DMA (Direct Memory Acces) unit is preferably integrated in the processor component. For loading this unit is appropriately programmed by the processor so as to read the missing page (pages) and write these pages into the RAM memory.

The external memory itself may be a parallel flash memory which is coupled to the processor component via a suitable interface. It is advantageous when the external memory is a serial flash memory which is coupled to the processor component via an SPI interface which converts the data to be transferred to the processor component from serial to parallel. The parallel data in its turn is transferred from and to the internal RAM memory by means of the optionally provided DMA unit. The data transfer is thus decoupled as far as possible from other processor activities.

Figure 2:
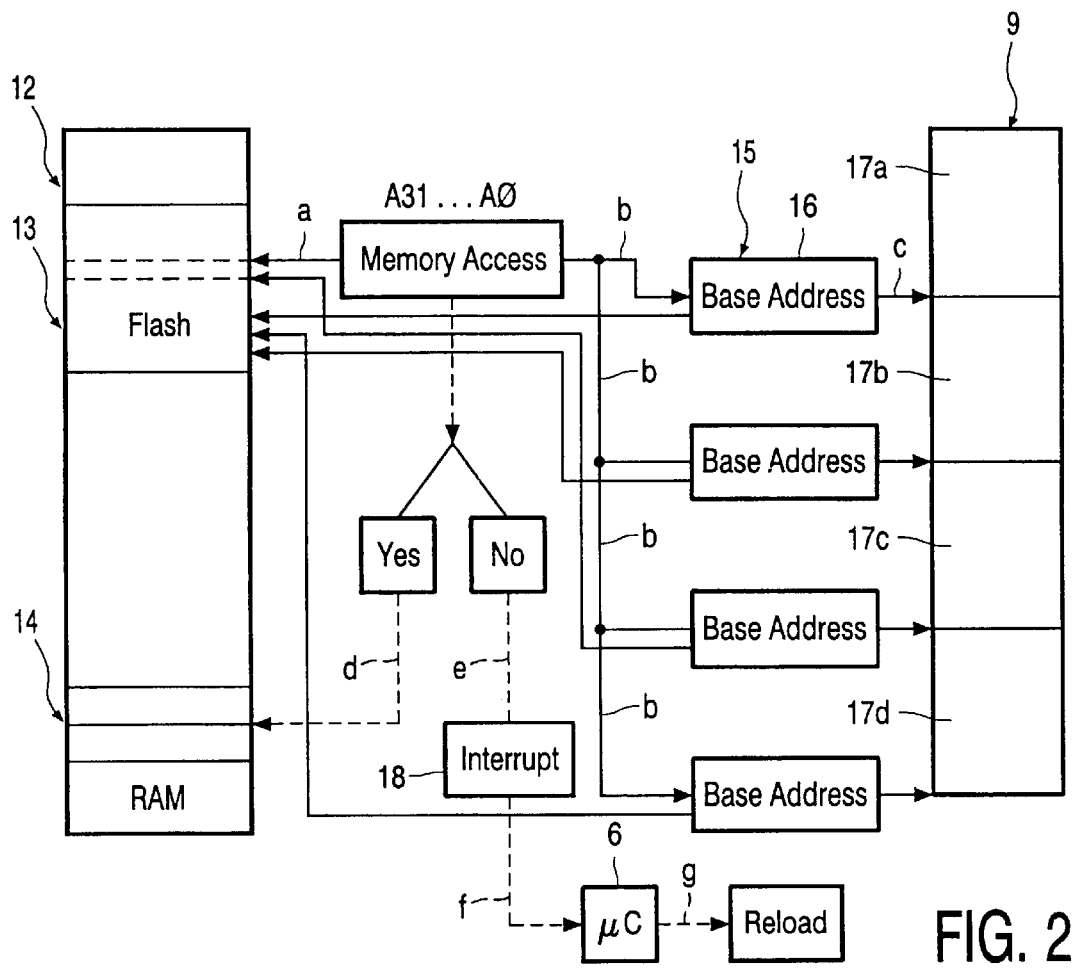

Further advantages, features and details of the invention will become apparent from the embodiment of the invention that will be described in detail hereinafter with reference to the drawings. Therein:

FIG. 1 illustrates the principle of a processor memory system in accordance with the invention, FIG. 2 illustrates the operating principle of the system shown in FIG. 1, and FIG. 3 illustrates the principle of the operation involving two data address registers.

FIG. 1 shows a processor memory system 1 in accordance with the invention which consists of a processor component 2 and an external flash memory 3 which is in this case constructed as a serial flash memory. The flash memory is connected to the processor component 2 via a communication line 4 with an interface 5, in this case being an SPI interface. The serial data supplied by the serial flash memory 3 is converted into parallel data via the SPI interface and vice versa in the reverse communication direction.

Furthermore, a processor 6 and a memory management component 7 which takes over the actual memory management tasks are also integrated in the processor component 2. There are also provided a DMA unit 8 as well as a RAM memory 9. Via the DMA unit 8, data is loaded from the external flash memory 3 into the RAM memory 9, via the interface 5, and vice versa data is applied to the external flash memory 3. Finally, a further memory 10, which may be, for example a ROM memory or a further flash memory, is also integrated in the processor component 2. All of said components, with the exception of the external flash memory 3, are connected to a common communication bus 11.

The central component in the system 1 in accordance with the invention is formed by the programmable memory management component 7 whose operating principle is shown in FIG. 2. During operation, the processor 6 continuously applies data address requests to the memory management component 7 via the bus 11. These data addresses indicate data blocks in the external flash memory 3 which are required by the processor for operation in the current application. A part of this data has already been loaded into the RAM memory 9, via the DMA unit 8, in advance during operation. The RAM memory 9 is used as a fast memory which serves as a cache memory. Data present in the fast RAM memory 9 can be transferred to the processor 6 significantly faster than from the slowly operating external flash memory 3. The central management function is performed by the memory management component 7. An address output by the processor 6, being the address A31 ... A0 in the present example, is applied to the memory management component 7. This component first checks whether an address is concerned that can be associated with the external flash memory 3. The memory map 12 contains the starting and end addresses of the external memory. When said address request is given, the memory management component 7 first checks whether a flash memory address is concerned (arrow a). If so, the address supplied is compared with the base addresses 16 stored in a data address register 15 (arrow b). Only four base addresses 16 are stored in the data address register 15, because only four pages 17a, 17b, 17c, 17d have been loaded from the external flash memory 3 into the RAM memory 9 which is shown in part to the right of the address register 15. The remaining storage locations in the RAM memory 9 are available for the storage of other data. Each of the base addresses 16 indicates the starting address of the external memory address section in the relevant RAM memory page 17a, 17b, 17c, 17d. All data in the range from the base address to the base address plus page size 1 are thus stored in the RAM. The mapping of the external memory address issued by the processor on a RAM memory address is fixed in FIG. 2 and is represented by the respective arrows C.

If the test in conformity with the arrow b shows that the address searched can be assigned to the RAM memory, that is, that the page is already present in the RAM memory, the data address (see the dashed arrow d in the branch "Yes") is "bent" or converted in such a manner that it indicates the otherwise denoted address in the RAM memory at which the data originally searched with the address "A31 ... A0" is stored in the RAM 9. This data is then loaded into the processor 6.

If the comparison reveals that the data is not present, an interrupt instruction 18 is applied (see the arrow e in the branch "No") from the memory management component 7 to the processor 6 (see the arrow f). The microprocessor thus interrupts the current routine and starts, for example, an interrupt routine from the second memory 10 in the processor component 2. Subsequently, for example, the loading of the missing data from the flash memory 3 is started, for example, by the routine in the processor 6 (see the arrow g).

To this end, the processor 6 communicates with the DMA unit 8 which is supplied with the searched flash memory address so that it can perform the loading operation. During the loading operation for the more or less large data block the processor 6 is available for other tasks, that is, it is not in a wait state inhibiting all processor activities as in the case of a normal cache memory operation, so that it can be used for other tasks. Merely the current routine, for which the data is missing, is interrupted for the time being. As soon as the data has been loaded into the fast RAM memory 9, the processor 6 is informed. Overall this method of operation enables quasi continuous operation of the processor, even in the case of data access failure.

The memory management component thus behaves as a cache or as a programmable virtual memory, depending on whether or not a data access is successful. Generally the memory management component 7 operates as a cache in that it checks incoming data addresses as to whether they are present in the address register or are stored in the RAM memory 9. If that is the case, the address given is "bent" accordingly, so that the relevant memory location in the RAM memory is indicated by the memory management component 7 and the data can be read therefrom. In the case of a "cache-miss", it is treated as a "page fault" as is already known for a virtual memory component. Unlike in the case of a pure cache function, in that case only an interrupt instruction is given so as to interrupt the current application in the processor and to initiate the loading operation.

In the case of pure cache operation there would be a wait state in this event; as a result, the processor overall would be blocked for all operations, that is, until the data has been transferred from the slow flash memory. This may take a comparatively long period of time, because the external flash memory is a slow memory. In the system in accordance with the invention, however, the processor is merely in a state of interrupt as has already been stated, so that it can perform other operations while the missing information is transferred to the RAM memory 9 via the DMA unit. In the mean time the memory management component 7 remains passive.

Figure 3A:
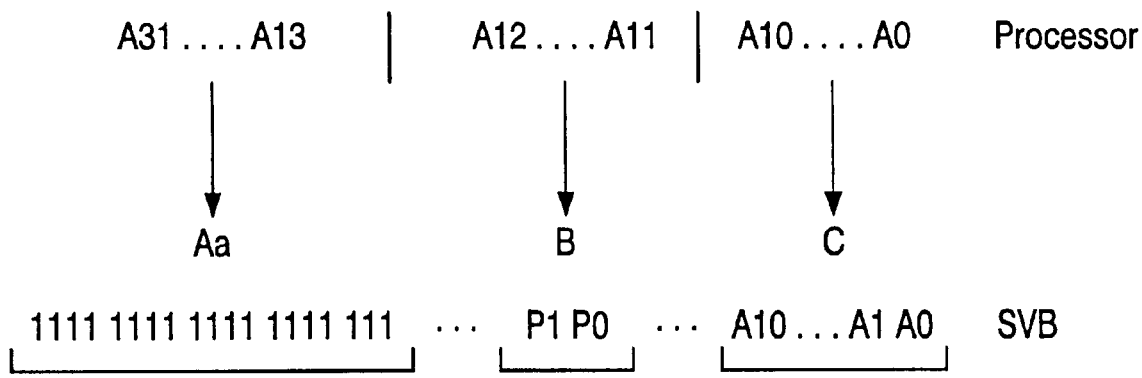

FIG. 3a shows a fixed conversion of the external memory address given by the processor (arrow c, FIG. 2) into a RAM memory address in case the external memory address contents searched has been loaded into the RAM memory (arrow d, FIG. 2). For each of the registers the relevant "working address" that is "processed" by the memory management component 7, is indicated at the right. The first address block A contains the base address of all pages in the RAM memory. In the example shown the address is 1111 1111 11111 1111 111 and indicates that the RAM memory section in which the external memory data is stored is situated at the upper end of the address map.

The data block B indicates the relevant page where the searched address data is situated. P0 and P1 are set in dependence on the fact in which of the four base address registers the base address of the external memory address ("working address") given by the processor was found (arrow b, FIG. 2). Finally, the "working address" also contains the block C with the address within a page, being An ... A0 in the example shown. This part of the address is taken over directly by the processor 6. The parts A and B are modified as indicated by the memory management unit.

Figure 3B:
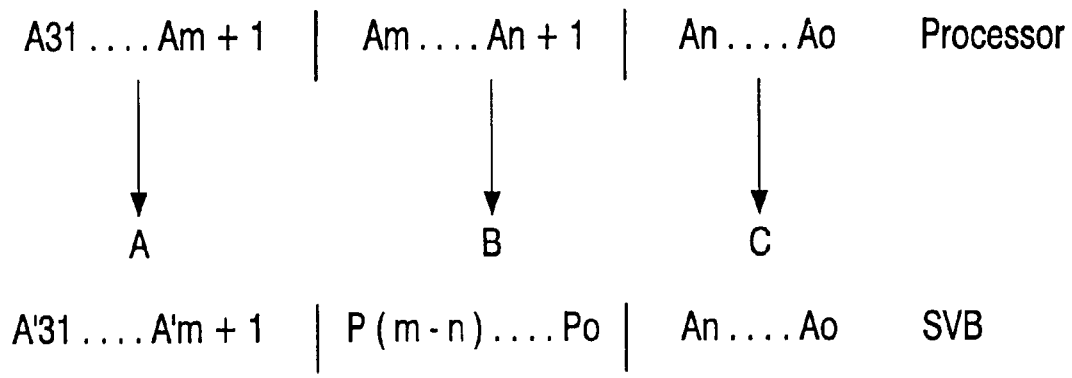

FIG. 3b, however, shows a flexible conversion. As opposed to a fixed conversion, the boundaries between the areas A, B and C can now be chosen at liberty. The length of B is determined by the number of base address registers. The areas B and C are mapped by means of the same method as used for the fixed conversion. For the area A an arbitrary RAM memory base address can be programmed. This enables a programmable position and size of the RAM memory pages. Thus, in this case a fully flexible conversion that is programmed by the interrupt in the memory management unit is realized.

It is also possible to influence the loading strategy by suitable programming of the memory management component. For example, in the case of loading it is possible to load not only the searched page or the searched data block but also the next ones. The interrupt behavior can then also be influenced by the programming of the memory management component. This can be performed in such a manner that interrupts are triggered already when the data actually has already been loaded into the RAM memory. This enables fast continuation of the program without loading ,so that the loading of the next page can commence in anticipation. The programmability also enables flexible subdivision of the memory capacity of the RAM memory, that is, the area intended for loading the flash memory data can be dynamically changed.

Finally, FIG. 4 shows the possibility for operating with an extended data address register. This Figure shows two data address registers 15a, 15b; the register 15b succeeds the register 15a. The register 15a essentially corresponds to that of FIG. 2. The register 15b is also constructed as a 4-page address register. The programming of the processor determines whether the data address register 15a or 15b is active. This means that the memory management component operates either with the data address register 15a or with 15b.

What is claimed is:

1. A processor memory system which includes:
   a processor component (2) provided with a processor (6) and at least a first integrated RAM memory (9),
   at least one second external memory (3) which is coupled to the processor component (2) via an interface (5),
   a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance,
   wherein the memory management component (7) indicates a first RAM memory address at which the data associated with the data address is stored if the data is present in the first RAM memory, the data then being read from the first RAM memory (9),
   wherein, if the data address is not present in the first RAM memory (9), the memory management component (7) outputs an interrupt instruction to the processor (6) and a direct memory access (DMA)unit (8) subsequently initiates the loading of the searched data address from the external memory (3) into the first RAM memory (9) and
   wherein the processor component (2) can perform other activities during the loading by the DMA unit (8).

2. A processor memory system as claimed in claim 1, wherein there is provided a data address register (15, 15a, 15b) in which the data addresses of the data that are stored in pages in the first RAM memory (9) are stored.

3. A processor memory system as claimed in claim 2, characterized in that
   the data address register (15, 15a, 15b) is constructed as a 4-page address register.

4. A processor memory system as claimed in claim 2, characterized in that
   the external memory (3) is a serial flash memory which is coupled to the processor component (2) via an interface (5) which converts the data to be transferred to the processor component (2) from serial to parallel.

5. A processor memory system as claimed in claim 4, characterized in that
   the serial interface is an SPI interface.

6. A processor memory system as claimed in claim 2, characterized in that
   the external memory is a flash memory.

7. A processor memory system as claimed in claim 2, characterized in that
   the external memory is integrated within the processor memory system.

8. A processor memory system which includes:
   a processor component (2) provided with a processor (6) and at least a first integrated RAM memory (9),
   at least one second external memory (3) which is coupled to the processor component (2) via an interface (5),
   a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance,
   wherein the memory management component (7) indicates a RAM memory address at which the data associated with the data address is stored if the data is present in the first RAM memory, the data then being read from the first RAM memory (9),
   wherein, if the data address is not present in the first RAM memory (9), the memory management component (7) outputs an interrupt instruction to the processor (6) which subsequently initiates the loading of the searched data address from the external memory (3) into the first RAM memory (9) and
   wherein there is provided a first data address register (15a) in which the data addresses of the data that are stored in pages in the first RAM memory (9) are stored, and there is provided a second data address register (15b), in the context of the address checking first the addresses in the first data address register (15a) being checked while, in the absence of the searched address, the register address which indicates in which register the check is performed can be changed by the processor (6), so that the check can be performed in the second data address register (15b).

9. A processor memory system which includes:
   a processor component (2) provided with a processor (6) and at least a first integrated RAM memory (9),
   at least one second external memory (3) which is coupled to the processor component (2) via an interface (5),
   a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance,
   wherein the memory management component (7) indicates a RAM memory address at which the data associated with the data address is stored if the data is present in the first RAM memory, the data then being read from the first RAM memory (9), wherein, if the data address is not present in the first RAM memory (9), the memory management component (7) outputs an interrupt instruction to the processor (6) which subsequently initiates the loading of the searched data address from the external memory (3) into the first RAM memory (9) and wherein there is provided a data address register (15, 15a, 15b) in which the data addresses of the data that are stored in pages in the first RAM memory (9) are stored, and at least one further memory (10) is integrated in the processor component (2), said further memory storing an interrupt routine which is accessed by the processor (6) subsequent to the interrupt instruction from the memory management component (7).

10. A processor memory system as claimed in claim 9, wherein the further memory (10) is a ROM memory or a flash memory.

11. A processor memory system which includes:

a processor component (2) provided with a processor (6) and at least a first integrated RAM memory (9), at least one second external memory (3) which is coupled to the processor component (2) via an interface (5), a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance, wherein the memory management component (7) indicates a RAM memory address at which the data associated with the data address is stored if the data is present in the first RAM memory, the data then being read from the first RAM memory (9), wherein, if the data address is not present in the first RAM memory (9), the memory management component (7) outputs an interrupt instruction to the processor (6) which subsequently initiates the loading of the searched data address from the external memory (3) into the first RAM memory (9) and wherein there is provided a data address register (15, 15a, 15b) in which the data addresses of the data that are stored in pages in the first RAM memory (9) are stored, and an amount of data to be unloaded preferably in pages from the external memory (3), or a magnitude of the storage sections in the RAM memory (9), can be modified or adjusted by the programmable memory management component (7).

12. A processor memory system which includes:

a processor component (2) provided with a processor (6) and at least a first integrated RAM memory (9), at least one second external memory (3) which is coupled to the processor component (2) via an interface (5), a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance, wherein the memory management component (7) indicates a RAM memory address at which the data associated with the data address is stored if the data is present in the first RAM memory, the data then being read from the first RAM memory (9), wherein, if the data address is not present in the first RAM memory (9), the memory management component (7) outputs an interrupt instruction to the processor (6) which subsequently initiates the loading of the searched data address from the external memory (3) into the first RAM memory (9)

wherein there is provided a data address register (15, 15a, 15b) in which the data addresses of the data that are stored in pages in the first RAM memory (9) are stored, and wherein each time only missing data can be loaded, notably in a form of pages, or the missing data as well as serially subsequent data can be loaded notably in the form of pages.

13. A processor memory system which includes:

a processor component (2) provided with a processor (6) and at least a first integrated RAM memory (9), at least one second external memory (3) which is coupled to the processor component (2) via an interface (5), a programmable memory management component (7) which is integrated in the processor component (2) and checks, in the case of a data address requested by the processor (6), whether this data address is stored in the first RAM memory (9) which serves as a fast memory and in which data from the external memory (3) has been loaded in advance, wherein the memory management component (7) indicates a RAM memory address at which the data associated with the data address is stored if the data is present in the first RAM memory, the data then being read from the first RAM memory (9), wherein, if the data address is not present in the first RAM memory (9), the memory management component (7) outputs an interrupt instruction to the processor (6) which subsequently initiates the loading of the searched data address from the external memory (3) into the first RAM memory (9)

wherein there is provided a data address register (15, 15a, 15b) in which the data addresses of the data that are stored in pages in the first RAM memory (9) are stored, and wherein an address conversion can be programmed so as to be either fixed or flexible.

* * * * *